(12) United States Patent
Gutmann et al.

(10) Patent No.: US 7,926,379 B2
(45) Date of Patent: Apr. 19, 2011

(54) GEAR PAIR CONSISTING OF A CROWN GEAR AND OF A PINION GEAR

(75) Inventors: Peter Gutmann, Munich (DE);
Heinrich Stettinger, Munich (DE);
Frank Zerling, Pastetten (DE)

(73) Assignee: Thyssenkrupp Prazisionsschmiede GmbH, Munich (DE)

( * ) Notice: Subject to any disclaimer, the term of this patent is extended or adjusted under 35 U.S.C. 154(b) by 910 days.

(21) Appl. No.: 11/722,407

(22) PCT Filed: Dec. 9, 2005

(86) PCT No.: PCT/EP2005/013234
§ 371 (c)(1),
(2), (4) Date: Jun. 21, 2007

(87) PCT Pub. No.: WO2006/072355
PCT Pub. Date: Jul. 13, 2006

(65) Prior Publication Data
US 2010/0000357 A1   Jan. 7, 2010

(30) Foreign Application Priority Data

Dec. 23, 2004   (DE) .......................... 10 2004 062 379

(51) Int. Cl.
*F16H 55/08*   (2006.01)
*F16H 55/17*   (2006.01)
(52) U.S. Cl. ............................................. 74/462; 74/416
(58) Field of Classification Search .................... 74/462, 74/416, 457, 460, 464, 466, 459.5
See application file for complete search history.

(56) References Cited

U.S. PATENT DOCUMENTS

| 2,313,183 | A |   | 3/1943  | Trbojevich |
|-----------|---|---|---------|------------|
| 3,820,414 | A | * | 6/1974  | Baxter, Jr. ........................ 74/462 |
| 4,744,263 | A | * | 5/1988  | Kuiken ............................ 74/462 |
| 5,845,533 | A |   | 12/1998 | Basstein et al. |

FOREIGN PATENT DOCUMENTS

| DE | 10147681 A1   |   | 4/2003  |
|----|---------------|---|---------|
| EP | 0271844 A     | * | 6/1988  |
| JP | 63180766 A    | * | 7/1988  |
| WO | 2004/099649 A | * | 11/2004 |

OTHER PUBLICATIONS

Internatioanl Search Report dated Feb. 15, 2006 from the corresponding PCT/EP2005/013234.*

* cited by examiner

*Primary Examiner* — Richard W Ridley
*Assistant Examiner* — Terence Boes
(74) *Attorney, Agent, or Firm* — Katten Muchin Rosenman LLP

(57) ABSTRACT

The invention relates to a gear pair consisting of a crown gear (1) and of a pinion gear (2) provided in the form of a spur gear with an axis crossing angle of 90°. According to the invention, the teeth (3) of the pinion gear (2), in order to reduce an undercut of the teeth (5) of the crown gear (1), have a pressure angle, which increases from the outside inward in a radial direction with regard to the crown gear (1), or in the event of a constant pressure angle, have a profile offset, which decreases from the outside inward in a radial direction with regard to the crown gear (1).

19 Claims, 5 Drawing Sheets

GEAR PAIR CONSISTING OF A CROWN GEAR AND OF A PINION GEAR

Figure 1:
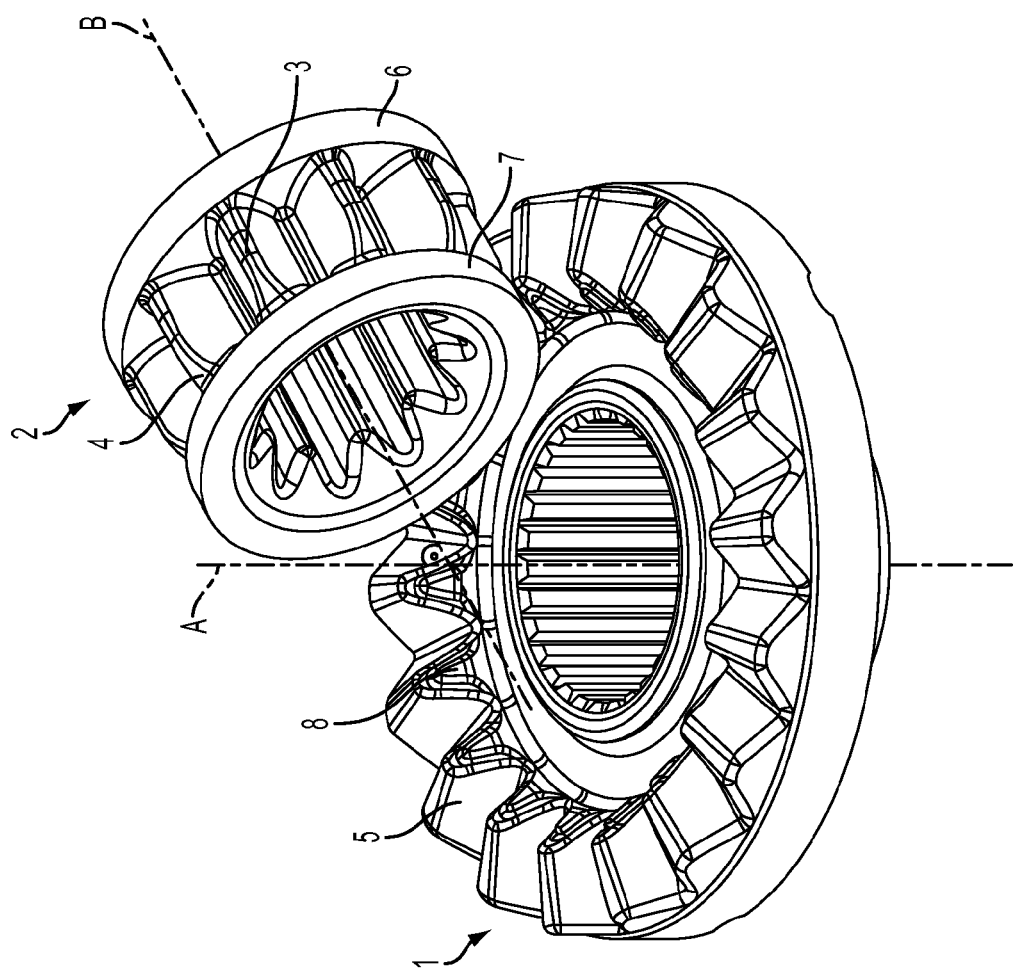

The present invention relates to a gear pair comprising a crown gear and pinion as a straight-toothed spur gear, wherein the axes intersect at an angle of 90° as well as to a differential gear mechanism, which is provided with at least two inventive gear pairs with mutually facing crown gears.

A gear pair of the class in question as well as a differential gear mechanism produced therefrom is described in DE 10147681 A1. Although the crown-gear mechanism described therein is superior in some respects to the bevel-gear mechanisms normally used for differential gear mechanisms, especially in view of their short axial depth as well as their high tooth-root overload safety, crown-gear mechanisms have not yet become commonplace for differential equalization in the automotive sector for reasons of continuous operating strength.

Extremely large and especially sudden loads can act on the mechanism toothing in differential gear mechanisms. Gear pairs of the class in question, comprising a crown gear and a pinion constructed as a straight-toothed spur gear, have not yet been able to survive these high stresses and strains. The limit conditions of a crown-gear toothing of the class in question are determined substantially by the configuration of the crown-gear toothing. By virtue of the geometrically imposed short radial line of contact, especially the tooth flank load-bearing capacity of the crown-gear teeth has proved to be critical for the operating strength of such a gear pair, whereas the load-bearing capacity of the tooth root can be evaluated as rather uncritical, by virtue of the full-surface end-face structure of the teeth on the crown gear. In addition, however, it must always be ensured that the pinion and its toothing also has adequate strength.

Starting from the aforesaid prior art, it is the object of the present invention to improve the strength of a gear pair of the class in question, comprising a crown gear and pinion, especially the tooth-flank load bearing capacity of the crown-gear teeth.

This object is achieved with the present invention by the fact that, in a gear pair of the class in question, comprising a crown gear and pinion, the teeth of the pinion, in order to reduce an undercut of the crown-gear teeth, are provided with a pressure angle that increases from outside to inside in radial direction relative to the crown gear—as specified in claim 1—or, in the case of a constant pressure angle, are provided with a profile displacement that decreases from outside to inside—as specified in independent claim 5. The toothings of the inventive gear pair comprising crown gear and pinion are—as is customary—of mutually conjugate form in the load-bearing tooth-flank regions. Starting from a pinion tooth geometry specified according to the invention, it is possible by means, for example, of numerical design of the rolling operation of the pinion toothing, to design the crown-gear tooth geometry that is conjugate with the inventive configuration of the pinion teeth.

The configurations according to independent claims 1 and 5 are related to one another by the common inventive idea, which is to achieve a reduction of the undercut of the crown-gear teeth that is necessary in radially inward direction by means of a radial—relative to the crown gear—variation of the geometry of the pinion toothing, and in this way to permit lengthening of the load-bearing flanks of the crown-gear teeth in radially inward direction.

The terms pressure angle and profile displacement are defined in the manner typical for gear pairs, as can be found, for example, in DIN 3960. This pressure angle denotes the angle between the normal to the surface in the pitch circle and the tangent to the pitch circle at the rolling point. The profile displacement is the distance of the profile reference line (profile centerline) of the reference profile from the pitch circle, which is calculated as an absolute number from the product of the dimensionless profile displacement factor multiplied by the gear module. A decrease of the profile displacement therefore results in an increase of the tooth thickness, especially the tooth tip thickness.

According to the definition in claim 1 or in claim 5, the increase of the pressure angle or respectively the decrease of the profile displacement of the pinion teeth in radial direction from outside to inside takes place relative to the radial extent of the crown gear. This corresponds to the axial direction relative to the pinion. This can be used in the absence of a directional frame of reference, since it is predetermined by the orientation of the pinion relative to the crown gear, albeit not as a reference system for this definition.

Because of the particularly advantageous configuration of the toothing of the inventive gear pair comprising crown gear and pinion, the tooth flanks of the crown-gear teeth can be used over a greater radial width than in the prior art. This is permitted on the one hand by a pinion tooth pressure angle that increases radially from outside to inside, thus achieving a reduction of the tooth flank undercut that would otherwise occur in the crown-gear teeth. In this way a larger part of the tooth flanks of the crown-gear teeth can be used actively for force transmission. On the other hand, the profile displacement decreasing radially—at constant pressure angle—from outside to inside permits, in extremely advantageous manner, active use of the crown-gear teeth over a greater radial width. The length of the contact line and overall contact ratio of the crown-gear toothing is advantageously increased.

According to an advantageous configuration of the inventive gear pair comprising crown gear and pinion, it is provided that, in the case of pinion-toothing pressure angle increasing in radially inward direction, the pinion teeth are further provided with a variable profile displacement. This profile displacement can on the one hand decrease advantageously from outside to inside in radial direction—as already described hereinabove for constant pressure angle. On the other hand, in the case of an inwardly increasing pressure angle, however, there can also be provided a profile displacement that increases inwardly, thus compensating to a certain extent for any excessive tapering of the pinion teeth tip that may occur. Also with this configuration, there can be advantageously achieved a longer contact line and a higher overall contact ratio than in the case of a gear pair of the class in question.

In each of the aforesaid cases, it is additionally provided according to a further advantageous configuration that the pinion teeth have a tip shortening from outside to inside in radial direction, in the form of a decrease in tip circle diameter, or in other words a decrease in the tooth height. Thus it is possible extremely advantageously to further reduce the undercut of the crown-gear teeth or ideally to eliminate same.

The inventive configurations of a gear pair of the class in question are applicable especially in such cases in which the number of crown-gear teeth is located on that side of the undercut limit conditions for which, given normal tooth geometry with constant profile displacement, constant pressure angle and constant tooth height, a harmful undercut of the crown-gear teeth would develop. It is precisely the undercut limit condition that is positively influenced with gear pairs according to the present invention, in other words, in each case the load-bearing flank of the crown-gear teeth becomes broader in radially inward direction. In this way, non-load-bearing tooth-flank regions are advantageously avoided on the one hand, while tooth-flank regions that heretofore have not been useful are activated on the other hand; the overall contact ratio of the tooth flanks of crown gear and pinion is enlarged. The normal limit conditions of the toothing, especially the so-called taper limit, from which excessive taper of the respective toothing develops, as well as the interference limit, are to be observed advantageously in the configuration of an inventive gear pair.

Preferably, therefore, the inner and outer limit values of the pressure angle and/or of the profile displacement will be chosen such that the taper limit for the crown-gear teeth is met at the radially outer end and the taper limit for the pinion teeth is met at the radially inner end.

According to a preferred configuration of the present invention, in the case of a pressure angle increasing from outside to inside there is chosen a radially outer limit value for the pressure angle that lies at or close to the taper limit of the crown-gear teeth and there is chosen a radially inner limit value for the pressure angle that lies at or near the taper limit for the pinion teeth. Depending on starting data, there is obtained in this way, for advantageous configurations of an inventive gear pair, a variation of the pressure angle over the tooth width of up to approximately 5°, preferably even only up to approximately 2°, expressed in absolute values.

A further preferred configuration of the inventive gear pair provides the same limit conditions for the limit values at the radially outer and inner ends (outer: at or close to the taper limit of the crown-gear teeth; inner: at or near the taper limit of the pinion teeth). Depending on starting data, there is obtained in this way, for an advantageous configuration of an inventive gear pair, a variation of the dimensionless profile displacement factor over the tooth width of up to a value of approximately 0.4, preferably even only up to approximately 0.2, expressed in absolute values.

In the case of inwardly increasing pressure angle and variable profile displacement, a certain choice of mutually independent value pairs suitable for decreasing an undercut that would otherwise develop is available with the aforesaid limit conditions for the respective inner and outer limit values of the pressure angle and profile displacement. This is also explained by the fact that, in the case of inwardly increasing pressure angle, both an inwardly decreasing and an inwardly increasing profile displacement of the pinion teeth are possible and represent advantageous configurations of the invention.

The resulting asymmetric form of the teeth in axial direction of the pinion leads in a gear pair of the class in question with axial offset to asymmetric loadability during clockwise and counterclockwise rotation of the pinion relative to the crown gear. According to a further advantageous configuration, it is therefore provided, especially in regard to the preferred intended purpose of the inventive gear pair in a differential gear mechanism, that the inventive gear pair does not have an axial offset.

According to a further advantageous configuration of the inventive gear pair, auxiliary means that permit axial guidance of the pinion on the crown gear are to be provided for this purpose. In a preferred embodiment of the inventive gear pair, the pinion is provided for this purpose on the radially inner and/or outer end relative to the crown gear with an annular or cap-like stop member, which in particularly advantageous manner is formed in one piece with the pinion toothing. This embodiment achieves an extremely advantageous interactive effect in the resulting operating strength of a pair comprising crown gear and pinion, wherein there is provided a tip shortening that increases radially inward. In particular, such radially inward capping of the pinion substantially increases the tooth-root breaking strength of the pinion toothing on the toothing end located radially inward relative to the crown gear. Since, according to the aforesaid variant of the present invention, an undercut of the crown-gear teeth is advantageously avoided with a radially inward tip shortening of the pinion teeth, the weakening of the pinion teeth caused by the tip shortening can be advantageously countered and even over-compensated by the radially inward capping of the pinion toothing, which increases the strength thereof. Simultaneously, the axial guidance of the pinion on the crown gear achieved with the stop member helps to avoid radial shifting of the pinion (relative to the crown gear).

In the case of axial guidance of the pinion by means of stop members attached to or formed onto both ends of the pinion, the axial guidance of the pinion on the crown gear is further improved, as is the operating strength of the entire inventive gear pair.

A preferred improvement of the inventive gear pair further provides that the crown-gear teeth are spherically flattened in radially inward direction and the inner stop member of the pinion, on its face facing the pinion teeth, is formed so as to conform thereto and achieve surface-to-surface contact. With this configuration, especially the harmful effect of axially acting (relative to the crown gear) force surges on the gear pair can also be alleviated by the inner stop member, since at least part of such a force surge is diverted by the stop member of the pinion onto the radially inward spherical flattening of the crown-gear teeth. In this way, such a force is no longer transmitted directly via the teeth flanks of the crown gear and pinion toothings.

All materials and manufacturing methods known for toothed and crown gears from the prior art are available to the person skilled in the art for manufacture of an inventive gear pair. Examples include forming or/and chip-removing methods as well as the known methods for hardening the materials used.

Finally, the present invention also relates to a differential gear mechanism, which is provided with two mutually facing crown gears and, meshing therewith, one or more pinions of at least two gear pairs according to one of the preceding claims. Possible and detailed configurations may be found in the known prior art. The special configuration of the toothing of the inventive gear pair greatly increases the operating strength of such a differential gear mechanism, thus also considerably expanding the possible areas of use of the inventive differential gear mechanism. Even higher loads can be managed by the use of a plurality of pinions between the mutually facing two crown gears.

Figures 2A, 2B, 2C, 2D:
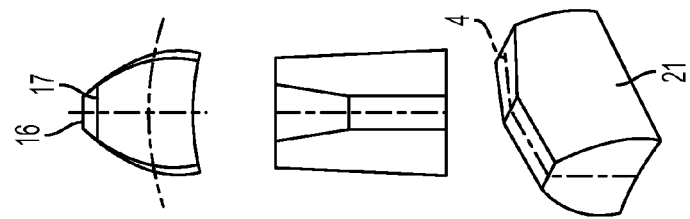
Figure 3A:
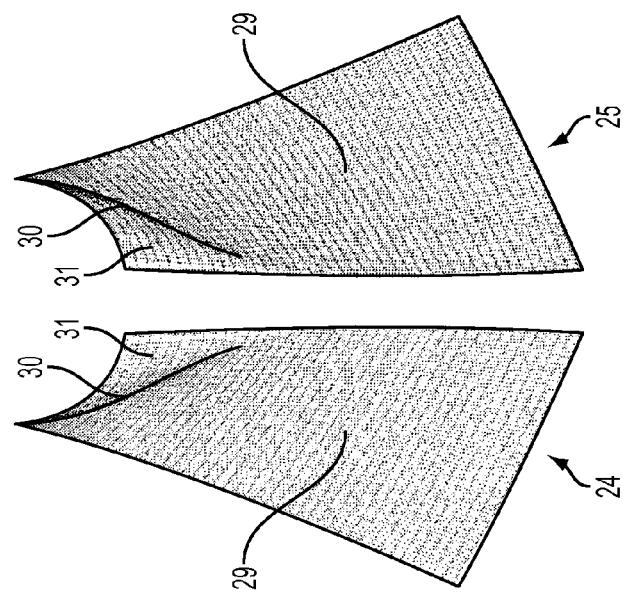
Figure 3B:
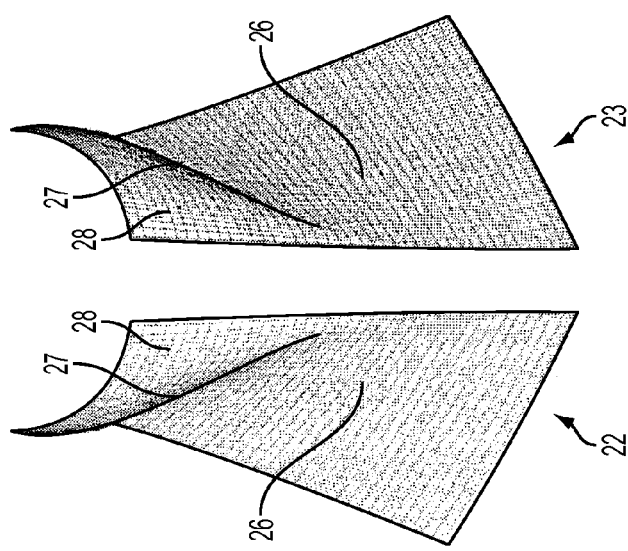
Figure 4:
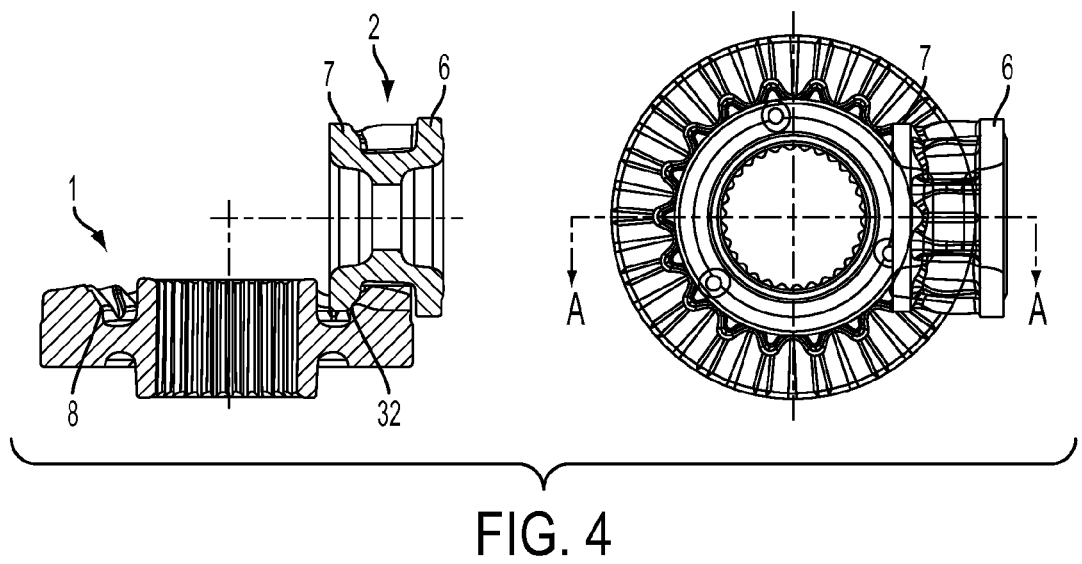

The inventive gear pair will be explained in more detail hereinafter by means of several practical examples with reference to the drawing, wherein:

FIG. 1 shows a perspective diagram of a practical example of the inventive gear pair, FIGS. 2a to 2d show different configurations of the pinion toothing of an inventive gear pair, FIGS. 3a and 3b show perspective diagrams of two numerically designed, mutually facing teeth flanks of the crown-gear toothing of a gear pair of the class in question and of an inventive gear pair, and FIGS. 4 to 7 each show two cross-sectional diagrams of practical examples of an inventive gear pair.

FIG. 1 shows a first practical example of an inventive gear pair comprising a crown gear 1 and a pinion 2 with straight spur toothing. Axis A of crown gear 1 intersects axis B of pinion 2 at an angle of 90°, without axial offset. Teeth 3 of pinion 2 have a tip shortening 4 that runs in axial direction of pinion 2 and, relative to crown gear 1 increases radially from outside to inside, and—not visible in this figure—a pressure angle that increases radially from outside to inside. The toothing of pinion 2 has a form conjugate to the toothing of crown gear 1; teeth 5 of crown gear 1 do not have an undercut. Moreover, pinion 2 is provided at its two ends with annular stop members 6 and 7 respectively, formed in one piece with the toothing. Of those, inner member 7 is formed on its inside, which is not visible in this diagram but is facing the toothing of pinion 2, in such a way that it matches and has surface-to-surface contact with the radially inwardly directed spherical flattening 8 of teeth 5 of crown gear 1.

FIGS. 2a to 2d each show a column of three partial diagrams of different configurations of the pinion toothing of an inventive gear pair. Each of these top partial diagrams shows the radially outer and radially inner cross-sectional geometry of a tooth of the pinion of an inventive gear pair. The middle partial diagram then shows a schematic overhead view of the respective tooth, which is finally shown in perspective in the respective bottom partial diagram.

FIG. 2a shows a pinion tooth 18 that has a variation of pressure angle over its axial width b (relative to the pinion). The cross-sectional geometry 9 of tooth 18 located at the radially outer end relative to the crown gear—not illustrated in this diagram—exhibits a thicker tooth tip and a narrower tooth root compared with the cross-sectional geometry 10 of tooth 18 located at the radially inner end. Pinion tooth 19 illustrated in FIG. 2b has a variation of the profile displacement over its axial width, resulting in a variation of the tooth thickness. This profile displacement decreases—relative to the crown gear—from the radially outer to the radially inner end, as is evident at cross sections 11 (outer) and 12 (inner). FIG. 2c shows a pinion tooth 20, in which both a radial increase of the pressure angle and a variation of the profile displacement are superposed. In the present case, the profile displacement increases from the radially outer to the radially inner end. Radially outer cross section 14 has greater thickness of the tooth root compared with tooth cross section 13 at the radially inner end. The thickness of tooth tip 15 remains substantially constant over the axial width of the tooth. Finally, FIG. 2d shows a pinion tooth 21 which has—besides a variation of the pressure angle and of the profile displacement as in FIG. 2c—additionally a tip shortening 4 increasing from the radially outer to the radially inner end. The height of tooth 21 remains constant in radially inward direction at first, beginning from the tooth height at outer cross section 16, then decreases continuously to a smaller tooth height at radially inner cross-sectional form 17 of tooth 21.

FIGS. 3a and 3b show two numerically designed, mutually facing tooth flanks 22, 23 and 24, 25 respectively of the crown-gear toothing of a gear pair of the class in question (FIG. 3a) and of an inventive (FIG. 3b) gear pair, in which the pinion toothing, formed to be conjugate thereto, has an inventive variation of pressure angle and profile displacement. In this illustrated perspective view, looking from the radially outer to the radially inner end, undercut limits 27 and 30, which separate tooth flanks 22 to 25 into load-bearing portions 26 and 29 as well as non-load-bearing, undercut toothflank portions 28 and 31, can be very clearly recognized. The inventive configuration of the gear pair according to FIG. 3b leads to a radially inner undercut 31 of the crown-gear teeth that is much smaller than undercut 28 of the crown-gear teeth of a gear pair of the class in question according to FIG. 3a. Compared with load-bearing tooth flanks 26 of the crown gear of a gear pair of the class in question, load-bearing tooth flanks 29 of the crown gear of an inventive gear pair are lengthened in radially inward direction.

Figure 5:
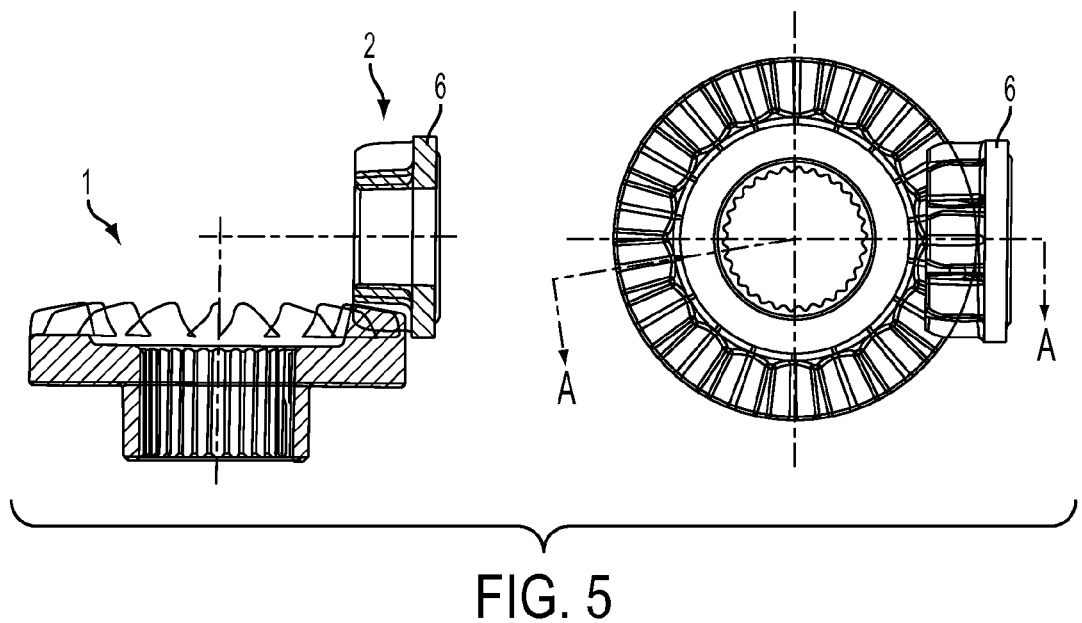
Figure 6:
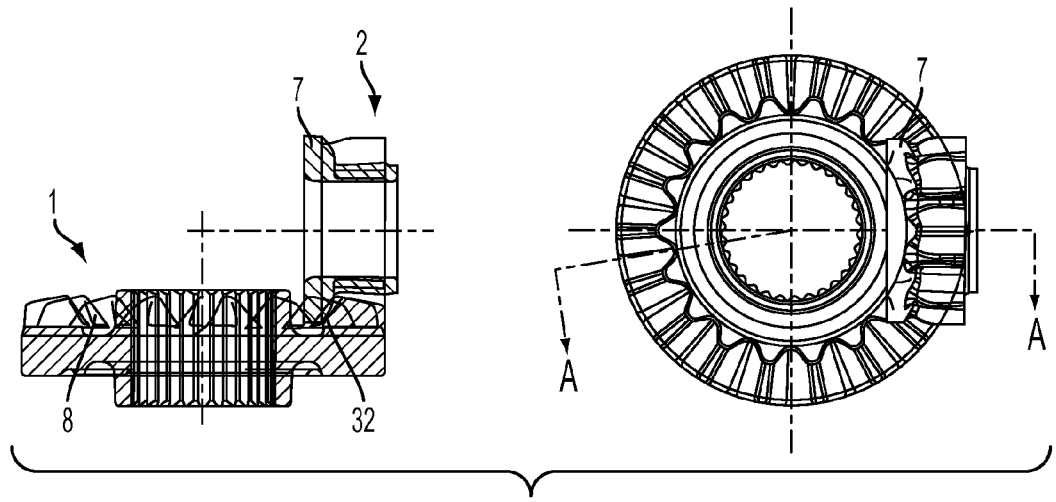
Figure 7:
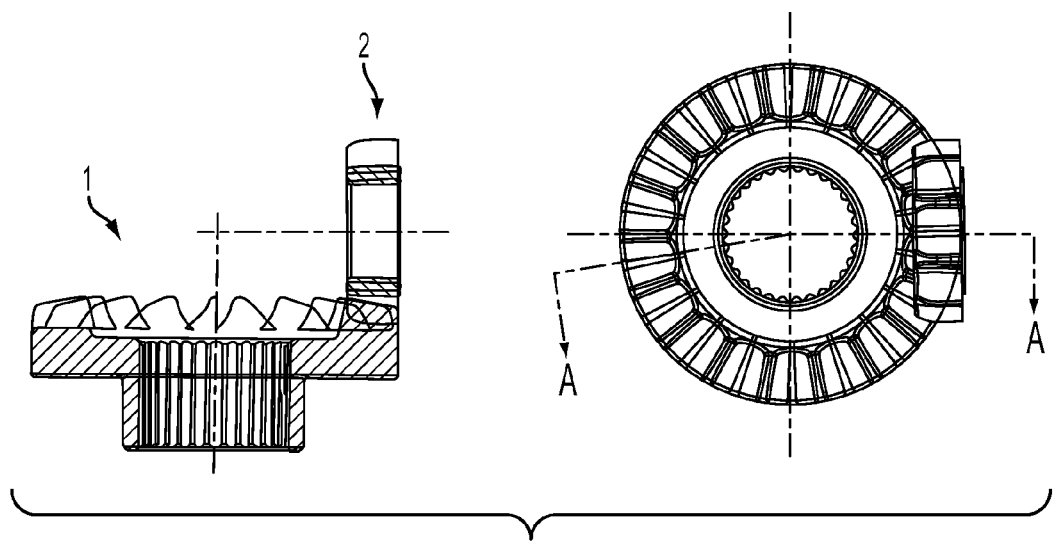

In FIGS. 4 to 7 there are shown further practical examples of inventive gear pairs comprising crown gear 1 and pinion 2, in each case in overhead view (right diagram) and in a cross-sectional diagram according to Section A-A (left diagram). In the practical examples according to FIG. 4 and FIG. 6, pinion 2 has an annular stop member 7 on a radially inner end in each case. Face 32 of inner stop member 7 facing the pinion teeth has a form matched to spherical flattening 8 of the crown-gear teeth, and it has surface-to-surface contact therewith. Pinion 2 of the practical example according to FIG. 4 further exhibits—in contrast to pinion 2 of the practical example according to FIG. 6—a second, radially outer stop member 6, so that pinion 2 is axially guided at both ends on crown gear 1 and can no longer be radially shifted thereon. For axial guidance of pinion 2 on crown gear 1, pinion 2 of the gear pair according to FIG. 5 is provided only on its radially outer end with an annular stop member 6, whereas pinion 2 of the gear pair according to FIG. 7 is not equipped with either an inner or an outer stop member. Axial guidance of pinion 2 on crown gear 1 of the practical example according to FIG. 7 is advantageously to be ensured by means of other axial guide elements (not illustrated), which are integrated in the gear pair or are disposed in proximity to the gear pair.

The invention claimed is:

1. A gear pair comprising a crown gear (1) and pinion (2) as a straight-toothed spur gear, wherein the axes intersect at an angle of 90°,
   wherein
   teeth (3) of the pinion (2), in order to reduce an undercut of teeth (5) of the crown gear (1), are provided with a pressure angle that increases from outside to inside in a radial direction relative to the crown gear (1).

2. A gear pair according to claim 1,
   wherein
   the teeth (3) of the pinion (2) are further provided with a variable profile displacement from outside to inside in the radial direction relative to the crown gear (1).

3. A gear pair according to claim 2,
   wherein
   a profile displacement of the teeth (3) of the pinion (2) increases from outside to inside.

4. A gear pair according to claim 2,
   wherein
   a profile displacement of the teeth (3) of the pinion (2) decreases from outside to inside.

5. A gear pair according to claim 1,
   wherein
   the teeth (3) of the pinion (2) additionally have a tip shortening (4) that increases radially from outside to inside.

6. A gear pair according to claim 5,
   wherein
   the undercut of the teeth (5) of the crown gear (1) is completely avoided.

7. A gear pair according to claim 1,
   wherein
   a radially outer limit value of the pressure angle increasing from a radially outer to a radially inner end of the teeth (3) of the pinion (2) lies at substantially at a taper limit for the teeth (5) of the crown gear (1) and the radially inner limit value of the pressure angle lies at or substantially at a taper limit for the teeth (3) of the pinion (1).

8. A gear pair according to claim 2,
   wherein
   a radially outer limit value of a variable profile displacement of the teeth (3) of the pinion (2) lies at or substantially at a taper limit for the teeth (5) of the crown gear (1)

and a radially inner limit value of the profile displacement lies at or substantially at a taper limit for the teeth (3) of the pinion (2).

9. A gear pair according to claim 1, wherein
tooth flanks of the teeth (3) of the pinion (2) and of the teeth (5) of the crown gear (1) are of mutually conjugate form at every point.

10. A gear pair according to claim 1, wherein
there is no axial offset between crown gear (1) and pinion (2).

11. A gear pair according to claim 1, wherein
the pinion (2) revolving on the crown gear (1) is guided axially.

12. A gear pair according to claim 11, wherein
the pinion (2) is provided on a radially inner end and/or a radially outer end relative to the crown gear (1) with an annular stop member (7, 6) for axial guidance.

13. A gear pair according to claim 12, wherein
the teeth (5) of the crown gear (1) are spherically flattened in a radially inward direction and an inner stop member (7) of the pinion, on its face (32) facing the teeth (3) of the pinion (2), is formed so as to conform thereto and achieve surface-to-surface contact.

14. A differential gear mechanism, which is provided with at least two gear pairs according to claim 1, wherein the pairs are formed by two mutually facing crown gears (1) and one or more pinions (2) disposed therebetween.

15. A gear pair comprising:
a crown gear and a pinion gear each having a central axis, the axes intersecting at a 90 degree angle;
the crown gear comprising a first toothing; and
the pinion being a straight-toothed spur gear and comprising a second toothing, the second toothing comprising a variable profile displacement from outside to inside in a radial direction relative to the crown gear and a pressure angle that increases from outside to inside in the radial direction relative to the crown gear to reduce an undercut of the first toothing;
wherein the pinion revolving on the crown gear is guided axially.

16. The gear pair of claim 15, wherein the profile displacement of the second toothing increases from outside to inside relative to the crown gear.

17. The gear pair of claim 15, wherein the profile displacement of the second toothing increases from inside to outside relative to the crown gear.

18. The gear pair of claim 15, wherein the second toothing comprise a tip shortening that increases radially from outside to inside relative to the crown gear.

19. The gear pair of claim 18, wherein the first toothing does not comprise an undercut.

\* \* \* \* \*